US006890647B1

(12) United States Patent
Nishida et al.

(10) Patent No.: US 6,890,647 B1
(45) Date of Patent: May 10, 2005

(54) ALUMINA HYDRATE PARTICLE, ALUMINA HYDRATE PARTICLE DISPERSION SOL AND LIQUID COATING FOR FORMING INK-RECEIVING LAYER AND SUBSTRATE HAVING INK-RECEIVING LAYER

(75) Inventors: Hiroyasu Nishida, Kitakyushu (JP); Naoyuki Enomoto, Kitakyushu (JP); Michio Komatsu, Kitakyushu (JP)

(73) Assignee: Catalysts & Chemicals Industries Co., Ltd. (JP)

( * ) Notice: Subject to any disclaimer, the term of this patent is extended or adjusted under 35 U.S.C. 154(b) by 0 days.

(21) Appl. No.: 10/070,110

(22) PCT Filed: Aug. 9, 2000

(86) PCT No.: PCT/JP00/05334

§ 371 (c)(1), (2), (4) Date: Feb. 28, 2002

(87) PCT Pub. No.: WO01/16026

PCT Pub. Date: Mar. 8, 2001

(30) Foreign Application Priority Data

Aug. 31, 1999 (JP) .......................................... 11-245496

(51) Int. Cl.[7] ................................................. B32B 5/16

(52) U.S. Cl. .................... 428/330; 428/329; 428/315.7; 428/32.14; 428/32.15; 423/84; 423/119; 423/312

(58) Field of Search ................................ 428/329, 330, 428/315.7, 32.14, 32.15, 402; 423/84, 119, 312

(56) References Cited

U.S. PATENT DOCUMENTS 4,022,840 A * 5/1977 Forni et al. ................. 585/660
4,371,513 A * 2/1983 Sanchez et al. ............. 423/625
5,275,867 A 1/1994 Misuda et al.
6,342,293 B1 * 1/2002 Nakahara et al. ........ 428/315.7

FOREIGN PATENT DOCUMENTS

JP 04-115984 A 4/1992
JP 4-263981 A 9/1992
JP 06-055829 A 3/1994
JP 9-118520 A 5/1997
JP 0934905 A2 * 2/1998 ............. C01F/7/02

OTHER PUBLICATIONS http://w1.cabot–corp.com glossary terms.*

Patent Abstracts of Japan, JP 03–024906, published Feb. 1, 1991, entitled “Molding Method of Concrete Molded Plate and Concrete Molded Plate”, Inventor: Matsuura Katsuharu.

Patent Abstracts of Japan, JP 10–206284, published Aug. 7, 1998, entitled “Test Method for Component for Vehicle”, inventor: Purakashu T Saza.

* cited by examiner

*Primary Examiner*—Rena Dye
*Assistant Examiner*—Tamra L. Dicus
(74) *Attorney, Agent, or Firm*—Webb Ziesenheim Logsdon Orkin & Hanson, P.C.

(57) ABSTRACT

Highly transparent alumina hydrate particles having a large pore volume, having a pore diameter which falls in a specified range and, when formed into a high-concentration dispersion sol, exhibiting a low viscosity are provided. Alumina hydrate particles having a composition represented by the general formula $xM_2O.y(NH_4)_2O.Al_2O_3.zH_2O$ ($2\times10^{-4}\leqq x\leqq25\times10^{-4}$, $0.1\times10^{-4}\leqq y\leqq20\times10^{-4}$, $0.6\leqq z\leqq2.5$, M represents an alkali metal; when the alkali metal is in the form of $M_2O$, x is the number of moles thereof per mol of $Al_2O_3$; when ammonia is in the form of $(NH_4)_2O$, y is the number of moles thereof per mol of $Al_2O_3$; and z is the number of moles of hydration water ($H_2O$) per mol of $Al_2O_3$), the alumina hydrate particles having an average particle diameter of 0.02 to 0.2 $\mu$m, a total pore volume of 0.5 to 1.5 ml/g, and a volume of pores whose diameter is from 15 to 30 nm ranging from 0.3 to 1.0 ml/g.

7 Claims, No Drawings

ALUMINA HYDRATE PARTICLE, ALUMINA HYDRATE PARTICLE DISPERSION SOL AND LIQUID COATING FOR FORMING INK-RECEIVING LAYER AND SUBSTRATE HAVING INK-RECEIVING LAYER

BACKGROUND OF THE INVENTION

1. Field of the Invention

The present invention relates to alumina hydrate particles, an alumina hydrate particle dispersion sol, and a coating liquid for forming an ink receptive layer wherein the alumina hydrate particles are contained. More particularly, the present invention relates to highly transparent alumina hydrate particles which contain alkali metal oxide and ammonia components in extremely minute amounts and which, when dispersed in water, exhibit a low viscosity, and further relates to a sol wherein the alumina hydrate particles are dispersed, to a coating liquid for forming an ink receptive layer wherein the alumina hydrate particles are contained, and to a substrate with ink receptive layer obtained from the coating liquid.

2. Description of the Prior Art

Fine particles of a metal oxide such as silica, alumina or alumina hydrate, fine particles of a metal hydroxide and sols obtained by dispersing these in solvents have been used in various fields. For example, there can be mentioned uses in a catalyst, a catalyst support, a material for film formation, a filler incorporated in a resin, various binders, a slip improver, a lubricant, a thickener, cosmetic ingredients, etc.

Recently, there is an increasing expectation for the use of alumina or alumina hydrate particles for formation of a receptive layer on a printing recording medium. For example, it is described in Japanese Patent Publication No. 3(1991)-24906 that a recording medium having a receptive layer wherein a cationic hydrated aluminum oxide is contained is highly suitable for printing with a water soluble dye ink.

It is further described in Japanese Patent Publication No. 4 (1992)-115984 that a recording sheet comprising a layer of pseudoboehmite alumina and, superimposed thereon, a layer of porous silica is highly transparent and exhibits high ink absorbency.

It is still further described in Japanese Patent Laid-open Publication No. 6(1994)-55829 that a recording sheet comprising a layer of porous silica particles having an average particle diameter of 2 to 50 $\mu$m, an average pore diameter of 8 to 50 nm and a pore volume of 0.8 to 2.5 cc/g and, superimposed thereon, a porous layer of pseudoboehmite obtained by drying alumina sol exhibits high ink absorbency and is excellent in pigment stability.

On the other hand, the inventors proposed in Japanese Patent Application No. 10(1998)-206284 a recording sheet with ink receptive layer prepared using a coating liquid for forming an ink receptive layer which contained oxide particles of positive $\zeta$-potential carrying on their surfaces a cationic hydrated metal compound, in particular, containing $Al^{3+}$ as a metal cation. The recording sheet was described as being free from blotting, enabling clear printing, and being excellent in water resistance, weather resistance, fading tendency, etc.

However, when conventional alumina particles of small pore diameter or small pore volume are employed, although pigment stability is excellent, the ink absorption speed is low and also the ink absorption capacity is small, so that blotting and unclearness have been experienced.

Moreover, the average pore diameter of alumina and alumina hydrate particles is generally in the range of about 5 to 15 nm, and it is difficult to obtain those of greater pore diameter. Even if those were obtained, the pore volume would be unfavorably small, and there would occur the problem of economic inefficiency caused by, for example, the need for post-treatment and special technique.

Further, with respect to the conventional alumina sol or alumina hydrate particle dispersion sol, the viscosity is high and the particles are likely to aggregate together, so that various problems have been posed. For example, it is difficult to prepare a high-concentration sol wherein the concentration of $Al_2O_3$ is about 8% by weight or greater, thereby necessitating transportation of a low-concentration sol. This would increase transportation cost. In the aforementioned uses, the preparation of a low-concentration sol only would, for example, disenable forming a thick coating because of the low concentration at the time of coating formation. For increasing the coating thickness, it would unfavorably be needed to repeat application and drying of a coating liquid.

Still further, even if a high-concentration sol is prepared from conventional alumina or alumina hydrate particles, there have been problems such that the transparency of the sol is poor and that the viscosity of the sol is extremely high.

In particular, it has been difficult to obtain a sol of high transparency and low viscosity from porous alumina.

The present invention has been made with a view toward solving the above problems of the prior art. In overcoming these problems, the present invention provides alumina hydrate particles and a process for producing same wherein the particles have a large pore volume and have a pore diameter which falls in a specified range, and, in addition, provides a highly transparent alumina hydrate particle dispersion sol which, even if in a high concentration, exhibits a low viscosity.

The present invention further provides a coating liquid for forming an ink receptive layer wherein the above alumina hydrate particles are contained, and provides a substrate with an ink receptive layer formed with the use of the coating liquid.

SUMMARY OF THE INVENTION

The alumina hydrate particles of the present invention have a composition represented by the general formula:

$$xM_2O.y(NH_4)_2O.Al_2O_3.zH_2O \quad (1)$$

$$2\times10^{-4}\leqq x\leqq 25\times10^{-4}$$

$$0.1\times10^{-4}\leqq y\leqq 20\times10^{-4}$$

$$0.6\leqq z\leqq 2.5$$

wherein M represents an alkali metal; when the alkali metal is in the form of $M_2O$, x is the number of moles thereof per mol of $Al_2O_3$; when ammonia is in the form of $(NH_4)_2O$, y is the number of moles thereof per mol of $Al_2O_3$; and z is the number of moles of hydration water ($H_2O$) per mol of $Al_2O_3$, the alumina hydrate particles having:

an average particle diameter of 0.02 to 0.2 $\mu$m, a total pore volume of 0.5 to 1.5 ml/g, and a volume of pores whose diameter is from 15 to 30 nm ranging from 0.3 to 1.0 ml/g.

The process for producing alumina hydrate particles according to the present invention comprises the steps of:

neutralizing an aqueous solution of alkali metal aluminate or an aqueous solution of aluminum salt to thereby form an alumina hydrogel;

separating the alumina hydrogel by filtration, and washing the separated alumina hydrogel with water and/or aqueous ammonia;

adjusting the pH value of the washed alumina hydrogel so as to fall within the range of 9 to 12, and heating the alumina hydrogel at 50 to 105° C. to thereby effect aging of the alumina hydrogel;

adding an acid to the alumina hydrogel so that the alumina hydrogel is deflocculated into an alumina hydrosol; and drying the alumina hydrosol.

The alumina hydrate particle dispersion sol of the present invention comprises a dispersion of the above alumina hydrate particles in water. This alumina hydrate particle dispersion sol preferably has a viscosity of 50 to 2000 cP exhibited when the $Al_2O_3$ has a concentration of 20% by weight. Further, this alumina hydrate particle dispersion sol preferably has an absorbance (ABS) of 0.6 or less exhibited when the $Al_2O_3$ has a concentration of 20% by weight.

The coating liquid for forming an ink receptive layer according to the present invention comprises:

the above alumina hydrate particles, and a binder, both dispersed in water and/or an organic solvent.

The substrate with ink receptive layer according to the present invention comprises a substrate sheet having an ink receptive layer formed thereon from the above coating liquid for forming an ink receptive layer.

DETAILED DESCRIPTION OF THE INVENTION

The alumina hydrate particles, alumina hydrate particle dispersion sol and coating liquid for forming an ink receptive layer according to the present invention will be described in detail below.

[Alumina Hydrate]

The alumina hydrate of the present invention is characterized by being represented by the following general formula (1), and contains an alkali metal and ammonia in a specified ratio.

$$xM_2O.y(NH_4)_2O.Al_2O_3.zH_2O \quad (1)$$

wherein M represents an alkali metal; when the alkali metal is in the form of $M_2O$, x is the number of moles thereof per mol of $Al_2O_3$; when ammonia is in the form of $(NH_4)_2O$, y is the number of moles thereof per mol of $Al_2O_3$; and z is the number of moles of hydration water ($H_2O$) per mol of $Al_2O_3$.

When the alkali metal of alumina hydrate particles is in the form of $M_2O$, the number of moles thereof (x) is in the range of $2\times10^{-4}$ to $25\times10^{-4}$ mol, preferably $3\times10^{-4}$ to $20\times10^{-4}$ mol, per mol of $Al_2O_3$. When the amount of alkali metal oxide $M_2O$ is less than $2\times10^{-4}$ mol, the recording sheet with ink receptive layer formed using the alumina hydrate particles may suffer from discoloration when printing is effected thereon. It is presumed that the reason for discoloration will be that, when the amount of alkali metal oxide is less than $2\times10^{-4}$ mol, the surface activity of alumina hydrate is so high that contained dye or other organic matter will be affected. On the other hand, when the amount of alkali metal oxide exceeds $25\times10^{-4}$ mol, the stability of sol wherein the alumina hydrate particles are dispersed may be lowered, or the viscosity thereof may be increased, so that it may be difficult to obtain a high-concentration sol.

When the ammonia of alumina hydrate particles is in the form of $(NH_4)_2O$, the number of moles thereof (y) is in the range of $0.1\times10^{-4}$ to $20\times10^{-4}$ mol per mol of $Al_2O_3$. When the amount of $(NH_4)_2O$ is less than $0.1\times10^{-4}$ mol, the recording sheet with ink receptive layer formed using the alumina hydrate particles, when printing is effected thereon, may suffer from decoloration of printed color. On the other hand, when the amount of $(NH_4)_2O$ exceeds $20\times10^{-4}$ mol, the stability of sol wherein the alumina hydrate particles are dispersed may be lowered, or the viscosity thereof may be increased, so that it may be difficult to obtain a high-concentration sol.

The number of moles of hydration water ($H_2O$) per mol of $Al_2O_3$, z, is in the range of 0.6 to 2.5 mol.

When the amount of hydration water is less than 0.6 mol, the dispersibility of alumina hydrate particles may be lowered, and the amount of electric charge on alumina hydrate particles tends to decrease so as to lower ink absorbency. On the other hand, when the amount of hydration water exceeds 2.5 mol, the pore volume of alumina hydrate particles tends to be small so as to lower ink absorbency.

Herein, the terminology "hydration water" refers to water remaining even after drying of alumina hydrate particles at 100° C. for 2 hr. The amount of hydration water is determined by drying a sample at 100° C. for 2 hr, heating the sample up to 600° C. in a stream of $N_2$ to thereby evolve a gas and then measuring the water content of the gas according to the Karl Fischer method.

The average particle diameter of these alumina hydrate particles is in the range of 0.02 to 0.2 μm, preferably 0.03 to 0.15 μm.

When the average particle diameter of alumina hydrate particles is less than 0.02 μm, the alumina hydrate particle dispersion sol has a high viscosity, and accordingly the coating liquid for forming an ink receptive layer prepared therefrom has a high viscosity. Thus, the coating liquid may have poor applicability. On the other hand, when the average particle diameter of alumina hydrate particles exceeds 0.2 μm, the alumina hydrate particle dispersion sol may have poor transparency. Thus, the obtained ink receptive layer may have poor transparency and poor printed image clearness.

The average particle diameter of alumina hydrate particles has been measured by means of particle size distribution meter (model CAPA-700, manufactured by Horiba Seisakusho Co., Ltd.).

The total pore volume of these alumina hydrate particles is in the range of 0.5 to 1.5 ml/g, preferably 0.6 to 1.4 ml/g. When the total pore volume is less than 0.5 ml/g, the ink receptive layer obtained from the alumina hydrate particles may exhibit poor ink absorbency to thereby disenable clear printing. On the other hand, when the total pore volume exceeds 1.5 ml/g, ink blotting may be likely to occur.

With respect to these alumina hydrate particles, the volume of pores whose diameter is from 15 to 30 nm is in the range of 0.25 to 1.0 ml/g, preferably 0.3 to 0.8 ml/g. When the volume of pores whose diameter is from 15 to 30 nm is less than 0.25 ml/g, the ink receptive layer obtained from the alumina hydrate particles may exhibit poor ink absorbency and unfavorably low ink absorption speed to thereby cause blotting and disenable clear printing. On the other hand, when the volume of pores whose diameter is from 15 to 30 nm exceeds 1.0 ml/g, the water resistance tends to be poor.

The total pore volume of alumina hydrate particles has been determined by measuring the volume of pores whose diameter is 600 Å or greater by means of mercury penetration porosimeter (model 2000, manufactured by Amco Inc.), measuring the volume of pores whose diameter is less than 600 Å according to the $N_2$ adsorption method and summing these two pore volume measurements. The volume of pores whose diameter is from 15 to 30 nm has been determined from that obtained in the above measuring of total pore volume.

These alumina hydrate particles are produced by, for example, the following process.

First, an aqueous solution of alkali metal aluminate or an aqueous solution of aluminum salt is neutralized to thereby form an alumina hydrogel.

The aqueous solution of alkali metal aluminate can be an aqueous solution of a water soluble salt such as sodium aluminate or potassium aluminate. An aqueous solution of sodium aluminate is especially preferably used.

The aqueous solution of aluminum salt can be, for example, an aqueous solution of aluminum sulfate or an aqueous solution of aluminum chloride. An aqueous solution of aluminum sulfate is preferred.

For example, the alumina hydrogel can be prepared by neutralizing an aqueous solution of alkali metal aluminate or an aqueous solution of aluminum salt, optionally in the presence of an alkali such as an alkali metal hydroxide and/or aqueous ammonia, or an acid such as a mineral acid or an organic acid. Also, the alumina hydrogel can be prepared by neutralizing an aqueous solution of alkali metal aluminate with an acidic compound such as a mineral acid or an organic acid. Further, the alumina hydrogel can be prepared by neutralizing an aqueous solution of aluminum salt with an alkali metal hydroxide and/or aqueous ammonia.

The aqueous solution of alkali metal hydroxide can be an aqueous solution of, for example, any of lithium hydroxide, sodium hydroxide, potassium hydroxide and strontium hydroxide. Of these, an aqueous solution of sodium hydroxide or potassium hydroxide is preferred. As an ammonia component, use can be made of urea which evolves ammonia when decomposed.

The mineral acid can be, for example, sulfuric acid, hydrochloric acid or nitric acid. The organic acid can be, for example, acetic acid, oxalic acid or citric acid.

A crystal growth inhibitor may optionally be added to the aqueous solution. A carboxylic acid such as gluconic acid, aspartic acid or adipic acid, or a carboxylic acid salt such as a gluconate, an aspartate or an adipate is preferably used as the crystal growth inhibitor.

The concentration of each of the above aqueous solutions, although not particularly limited as long as the alumina hydrogel can be formed, is preferably such that the concentration of formed $Al_2O_3$ is in the range of 1 to 5% by weight.

It is preferred that the pH value of prepared alumina hydrogel be in the range of about 9 to 12.

Further, it is preferred that, at the time of preparation, the liquid temperature of alumina hydrogel be in the range of 10 to 50° C.

The thus prepared alumina hydrogel is separated by filtration, and washed with water and/or aqueous ammonia to thereby remove salts. This washing is performed so that the amount of alkali metal contained in alumina hydrate particles is in the range of $2\times10^{-4}$ to $20\times10^{-4}$ mol, in terms of oxide, per mol of $Al_2O_3$.

The water content of washed alumina hydrogel is regulated so that the concentration in terms of $Al_2O_3$ is in the range of about 1 to 7% by weight. The pH value thereof is adjusted so as to fall within the range of 9 to 12 by optionally adding aqueous ammonia. Subsequently, the alumina hydrogel is heated at 50 to 105° C., preferably 80 to 105° C., for 10 to 100 hr to thereby effect aging of the alumina hydrogel.

Contained ammonia is preferably evaporated off as completely as possible during or after the aging of alumina hydrogel. Thus, the pressure may optionally be reduced to vacuum after the completion of aging to thereby remove ammonia. It is preferred that the removal of ammonia be effected until the ion conductivity of alumina hydrogel slurry falls within the range of 10 to 1000 $\mu$S/cm. When the ion conductivity is in this range, the content of ammonia, in the form of $(NH_4)_2O$, in finally obtained particles can be in the range of $0.1\times10^{-4}$ to $20\times10^{-4}$ mol per mol of $Al_2O_3$.

An alumina hydrosol can be obtained by adding an acid to the washed alumina hydrogel to thereby deflocculate the same. The added acid can be a mineral acid such as hydrochloric acid or nitric acid, or an organic acid such as acetic acid, as aforementioned.

The amount of added acid is preferably to be minimized as long as the deflocculation can be accomplished. The amount of acid is preferably about 0.2 mol or less per mol of $Al_2O_3$.

The alumina hydrosol obtained by the deflocculation is dried in hot air so as to obtain the alumina hydrate particles of the present invention. The alumina hydrate particle dispersion sol of the present invention can be obtained by dispersing the obtained alumina hydrate particles in water.

Although the drying method is not particularly limited as long as it is not detrimental to the dispersibility of obtained alumina hydrate particles, spray drying and similar dying methods are preferred from the viewpoint that the probability of adverse effect thereof on the dispersibility is low.

In the spray drying, it is preferred that the temperature of hot air fed into spray drying zone be in the range of 150 to 400° C. and that the temperature of gas discharged from the spray drying zone be in the range of 60 to 150° C.

When the temperature of hot air fed into spray drying zone is lower than 150° C., it may occur that the content of ammonia, in the form of $(NH_4)_2O$, in alumina hydrate particles cannot be $20\times10^{-4}$ mol or less per mol of $Al_2O_3$ to thereby disenable obtaining the alumina hydrate particles and alumina hydrate particle dispersion sol of high concentration, low viscosity and high transparency according to the present invention. On the other hand, when the above temperature exceeds 400° C., although the content of ammonia, in the form of $(NH_4)_2O$, can be $0.1\times10^{-4}$ mol or less per mol of $Al_2O_3$, the dispersibility thereof in a solvent (water) would be lowered to thereby cause obtaining a stable homogeneous sol or coating liquid to be difficult. Further, an alteration of printed color may be caused.

[Alumina Hydrate Particle Dispersion Sol]

The alumina hydrate particle dispersion sol of the present invention is a dispersion of the above alumina hydrate particles in water.

The viscosity of this alumina hydrate particle dispersion sol, exhibited when the concentration in terms of $Al_2O_3$ is 20% by weight, is preferably in the range of 50 to 2000 cP, still preferably 100 to 500 cP.

When the above viscosity is lower than 50 cP, the viscosity of the coating liquid such as the coating liquid for forming an ink receptive layer may be so low that it is difficult to form a thick coating film by one-time application. On the other hand, when the above viscosity of alumina hydrate particle dispersion sol exceeds 2000 cP, the viscosity of the coating liquid may be so high that handling of the coating liquid is difficult. Diluting this coating liquid in order to lower the viscosity thereof may cause formation of a thick coating film by one-time application to be difficult.

The absorbance (ABS) of alumina hydrate particle dispersion sol prepared so that the concentration in terms of $Al_2O_3$ is 20% by weight is preferably 2.0 or less, still preferably 1.5 or less. When the absorbance exceeds 2.0, the transparency of the coating film obtained from the alumina hydrate particles may be unsatisfactory.

The viscosity has been measured by the use of viscometer (model BM, manufactured by Tokimec, Inc.). With respect to the absorbance, that at a wavelength of 550 nm was measured by the use of spectrophotometer (model U-2000, manufactured by Hitachi, Ltd.).

With respect to the alumina hydrate particle dispersion sol of the present invention, because the above alumina hydrate particles of specified composition are dispersed therein, the concentration in terms of $Al_2O_3$ can be increased up to about 40% by weight. When the concentration in terms of $Al_2O_3$ exceeds 40% by weight, the viscosity of the coating liquid may be so high that the coating liquid cannot be handled and that it is difficult to form a coating film of uniform thickness.

[Coating Liquid for Forming Ink Receptive Layer]

The coating liquid for forming an ink receptive layer according to the present invention comprises the above alumina hydrate particles and a binder, both dispersed in water and/or an organic solvent.

Binder

Mainly, hydrophilic polymers are used as a binder in the coating liquid for forming an ink receptive layer according to the present invention. Examples of such hydrophilic polymers include polyvinyl alcohol, modified polyvinyl alcohol and polyvinylpyrrolidone. These can be modified before use. Also, hydrophobic polymers can be used as the binder.

The amount of binder added, although varied depending on the type of binder, is preferably in the range of 5 to 60% by weight, still preferably 10 to 40% by weight, based on the weight of alumina hydrate particles.

When the amount of binder is less than 5% by weight, the adherence between the ink receptive layer and a substrate sheet may be so poor that the ink receptive layer is easily peeled off. Also, the strength of the ink receptive layer may be poor. On the other hand, when the amount of binder exceeds 60% by weight, it may occur that the amount of ink reception is unfavorably reduced and that the water resistance is unsatisfactory.

The coating liquid for forming an ink receptive layer according to the present invention may contain, in addition to the above oxide particles and binder, an antioxidant, organic polymers such as celluloses, bio-fibers, an inorganic polymer, inorganic fine particles, etc. in order to enhance the adherence between ink receptive layer and substrate sheet, to increase the strength and weather resistance of ink receptive layer, or to regulate the pore structure of ink receptive layer.

Water and/or an organic solvent is used as a dispersion medium in the coating liquid for forming an ink receptive layer according to the present invention. The organic solvent can be, for example, isopropyl alcohol, ethanol or butanol.

The coating liquid for forming an ink receptive layer can be prepared by dispersing the above alumina hydrate particles in water and mixing the above components into the dispersion.

The concentration of alumina hydrate particles in the coating liquid, although appropriately selected depending on the application method, is preferably in the range of 2 to 40% by weight, still preferably 5 to 30% by weight.

When the concentration is lower than 2% by weight, the concentration of the coating liquid for coating film formation cannot be high to thereby disenable obtaining a thick coating film. On the other hand, when the concentration of alumina hydrate particles exceeds 40% by weight, the viscosity of the coating liquid may be so high that the coating liquid cannot be handled, or drying irregularity occurs, with the result that formation of a uniform coating film is difficult.

[Method of Forming Ink Receptive Layer and Ink Receptive Layer]

Customary methods can be employed for forming the ink receptive layer on a substrate sheet. Preferable methods can be employed depending on the type of substrate.

For example, the ink receptive layer can be formed by coating a substrate sheet with the above coating liquid for forming an ink receptive layer by the spray method, roll coater method, blade coater method, bar coater method, curtain coater method or the like, and thereafter drying the coating liquid.

The substrate may be pretreated with a primer before coating operation.

The substrate sheet for use in the present invention is not particularly limited, and can be, for example, any of a film sheet of a resin such as PET or polyvinyl chloride, various types of papers, a copper plate and a cloth.

In the thus formed ink receptive layer, it is preferred that the total pore volume thereof be in the range of 0.5 to 1.5 ml/g, especially 0.7 to 1.3 ml/g.

When the total pore volume of ink receptive layer is less than 0.5 ml/g, the volume of ink absorbed may be so small that blotting occurs to thereby disenable obtaining clear high-precision images. On the other hand, when the total pore volume of ink receptive layer is greater than 1.5 ml/g, dye fixability may be deteriorated, and the strength of ink receptive layer may be unfavorably low.

Although the thickness of the ink receptive layer formed on the substrate sheet can appropriately be selected depending on the thickness of sheet, the usage of printed matter, the type of printing ink, etc., is preferably in the range of 5 to 100 μm. When the thickness of the ink receptive layer is less than 5 μm, the volume of ink absorbed may be so small that blotting occurs, or that, when the amount of ink used is reduced, color is not clear. The ink receptive layer whose thickness is greater than 100 μm makes it difficult to obtain the same by one-time application. Performing a plurality of applications in order to form the ink receptive layer having thickness of greater than 100 μm is not only economically disadvantageous but also, at the time of drying after application, may cause cracking or peeling.

The alumina hydrate particles (powder) of the present invention contain specified amounts of alkali metal oxide and ammonia. Accordingly, the surface activity of alumina hydrate is so low that the deterioration of an organic substance such as a dye by the surface activity of alumina hydrate is inhibited. Therefore, the recording sheet with ink receptive layer formed using these alumina hydrate particles can be free from discoloration at the time of printing. These alumina hydrate particles, even if dispersed in high concentration, can be free from sol stability lowering or viscosity increase, so that a thick coating film can be formed therefrom.

These alumina hydrate particles (powder) have a large pore diameter and an increased pore volume, so that the use thereof in the formation of an ink receptive layer realizes an ink receptive layer which is excellent in pigment stability, exhibits a high ink absorption speed and has a large ink absorption capacity and which is free from blotting.

EXAMPLES

The present invention will be further illustrated below with reference to the following Examples, which in no way limit the scope of the invention.

Example 1

Preparation of Alumina Hydrate Particle

While agitating 12.7 kg of an aqueous solution of sodium aluminate (concentration in terms of $Al_2O_3$: 3% by weight), 7.3 g of a 26% by weight aqueous solution of sodium gluconate was added thereto, and further 25 kg of an aqueous solution of aluminum sulfate (concentration in terms of $Al_2O_3$: 1.5% by weight) was added over a period of 12 min. Thus, an alumina hydrogel was obtained. At the time of preparation of the alumina hydrogel, the liquid temperature of alumina hydrogel is 30° C. and pH of the obtained alumina hydrogel is 10.2.

Thereafter, the agitation was discontinued, and the alumina hydrogel was aged at 30° C. for 90 min.

The formed alumina hydrogel was separated by filtration, and washed with 1.5% aqueous ammonia. The amounts of alkali and sulfate radicals remaining in alumina were 0.022% by weight in terms of $Na_2O$ and 0.062% by weight in terms of $SO_4$ (both based on dry alumina powder), respectively.

Water was added to the washed alumina hydrogel so as to adjust the concentration in terms of $Al_2O_3$ to 5.0% by weight. Subsequently, 15% aqueous ammonia was added so as to adjust the pH value to 11.2, and, under slow agitation, aging of alumina hydrogel was performed at 95° C. for 80 hr. During the aging, the pH value was adjusted to 11.2 by adding 15% aqueous ammonia.

The removal of ammonia was performed for about 20 hr until the conductivity of alumina hydrogel slurry became 100 $\mu$S/cm by exhausting evaporated steam and ammonia gas while maintaining the temperature at 100 to 105° C.

After the removal of ammonia, the temperature was lowered to 95° C. Acetic acid was added in an amount of 5.5% by weight based on the weight of $Al_2O_3$, agitated for 3 hr, and cooled to 35° C. Pure water was added, thereby obtaining an alumina hydrosol having a concentration in terms of $Al_2O_3$ of 5.0% by weight.

The thus obtained alumina hydrosol was charged into a spray dryer, and spray drying was performed while controlling the temperature of hot air fed into spray drying zone at 250° C. and controlling the temperature of gas discharged from the spray drying zone at 100±10° C. Thus, powder of alumina hydrate particles (A) was obtained.

With respect to the obtained alumina hydrate particles (A), the alkali metal content, ammonia content, average particle diameter and total pore volume were measured.

The results are listed in Table 1.

Preparation of Water Dispersion Sol

Alumina hydrate particles (A) were dispersed in water, thereby obtaining a water dispersion sol having an $Al_2O_3$ concentration of 20% by weight. The viscosity thereof was measured. Further, a water dispersion was prepared by dispersing alumina hydrate particles (A) so that the concentration in terms of $Al_2O_3$ became 20% by weight, and the absorbance thereof was measured.

The results are also listed in Table 1.

Preparation of Coating Liquid for Forming Ink Receptive Layer

The above obtained alumina hydrate particles (A) were dispersed in water so that the solid concentration became 15% by weight. 100 parts by weight of this dispersion and 37.5 parts by weight of a 10% by weight aqueous solution of polyvinyl alcohol were mixed together, thereby obtaining a coating liquid.

Preparation of Recording Sheet

The obtained coating liquid was applied onto a PET film by means of a bar coater, dried, and heated at 140° C. Thus, a recording sheet was obtained. The thickness of the ink receptive layer was 30 $\mu$m. In the same manner as in Example 1, printing was performed on the obtained recording sheet and evaluated. The results are also listed in Table 1.

The following printing was performed on the obtained recording sheet, and evaluated.

The results are also listed in Table 1.

Printing

Pattern W of 2 cm square was printed all over on the obtained recording sheet by means of ink jet printer (Masterjet, manufactured by Graphtec) with the use of genuine dye inks. Magenta, black, cyan and yellow colors were used, and printing was effected while varying densities by changing the output. The following evaluation was conducted to obtainable printed sheet.

[Density]

The density was measured by means of color reflectometer (KRD-2200, manufactured by Nippon Denshoku Kogyo Co., Ltd.). When the density is 1.2 or higher, use can be made without any particular problem.

[Blotting]

The configuration of each printed dot was observed through a microscope, and evaluated on the following criteria:

Excellent: completely circular, and no blotting observed,

Good: circular, but slight blotting observed, and

Poor: circular, but clear blotting observed.

[Drying Speed]

With respect to two overlapped dots with different colors, the mixing of color was observed through a microscope, and evaluated on the following criteria:

Excellent: no color mixing observed,

Good: slight color mixing observed, and

Poor: clear color mixing observed.

[Water Resistance]

Printed pieces were immersed in water, and the leaching of pigment and dye therefrom was observed. Evaluation was made on the following criteria:

Excellent: no blotting observed,

Good: slight blotting observed,

Poor: clear blotting observed, and

Very poor: leaching of pigment or dye observed.

Example 2

Alumina hydrate particles (B) were prepared in the same manner as in Example 1 except that, in the washing step of Example 1, washing was performed with 0.5% aqueous ammonia in place of 1.5% aqueous ammonia.

After this ammonia washing, the amounts of alkali and sulfate radicals remaining in alumina hydrate particles (B) were 0.12% by weight in terms of $Na_2O$ (on dry basis) and 0.28% by weight in terms of $SO_4$ (on dry basis), respectively, based on the weight of $Al_2O_3$.

After the removal of ammonia, the conductivity of alumina hydrogel slurry was 250 $\mu$S/cm.

With respect to the obtained alumina hydrate particles (B), the alkali metal content, ammonia content, average particle diameter and total pore volume were measured.

The results are listed in Table 1.

Preparation of Water Dispersion Sol

Alumina hydrate particles (B) were dispersed in water, thereby obtaining a water dispersion sol having an $Al_2O_3$ concentration of 20% by weight. The viscosity thereof was measured. Further, a water dispersion was prepared by dispersing alumina hydrate particles (B) so that the concentration in terms of $Al_2O_3$ became 20% by weight, and the absorbance thereof was measured.

The results are also listed in Table 1.

Preparation of Coating Liquid for Forming Ink Receptive Layer

The above obtained alumina hydrate particles (B) were dispersed in water so that the solid concentration became 15% by weight. 100 parts by weight of this dispersion and 37.5 parts by weight of a 10% by weight aqueous solution of polyvinyl alcohol were mixed together, thereby obtaining a coating liquid.

Preparation of Recording Sheet

The obtained coating liquid was applied onto a PET film by means of a bar coater, dried, and heated at 140° C. Thus, a recording sheet was obtained. The thickness of ink receptive layer was 30 μm.

In the same manner as in Example 1, printing was performed on the obtained recording sheet and evaluated.

The results are also listed in Table 1.

Example 3

Powder of alumina hydrate particles (C) was prepared in the same manner as in Example 1 except that, in the ammonia removal step of Example 1, the removal of ammonia was performed for about 80 hr until the conductivity of alumina hydrogel slurry became 50 μS/cm.

With respect to the obtained alumina hydrate particles (C), the alkali metal content, ammonia content, average particle diameter and total pore volume were measured.

The results are listed in Table 1.

Preparation of Water Dispersion Sol

Alumina hydrate particles (C) were dispersed in water, thereby obtaining a water dispersion sol having an $Al_2O_3$ concentration of 20% by weight. The viscosity thereof was measured. Further, a water dispersion was prepared by dispersing alumina hydrate particles (C) so that the concentration in terms of $Al_2O_3$ became 20% by weight, and the absorbance thereof was measured.

The results are also listed in Table 1.

Preparation of Coating Liquid for Forming Ink Receptive Layer

The above obtained alumina hydrate particles (C) were dispersed in water so that the solid concentration became 15% by weight. 100 parts by weight of this dispersion and 37.5 parts by weight of a 10% by weight aqueous solution of polyvinyl alcohol were mixed together, thereby obtaining a coating liquid.

Preparation of Recording Sheet

The obtained coating liquid was applied onto a PET film by means of a bar coater, dried, and heated at 140° C. Thus, a recording sheet was obtained. The thickness of ink receptive layer was 30 μm.

In the same manner as in Example 1, printing was performed on the obtained recording sheet and evaluated.

The results are also listed in Table 1.

Example 4

Powder of alumina hydrate particles (D) was prepared in the same manner as in Example 1 except that, in the aging step of Example 1, aging was performed at 100° C. for 80 hr in place of 95° C. for 80 hr.

With respect to the obtained alumina hydrate particles (D), the alkali metal content, ammonia content, average particle diameter and total pore volume were measured.

The results are listed in Table 1.

Preparation of Water Dispersion Sol

Alumina hydrate particles (D) were dispersed in water, thereby obtaining a water dispersion sol having an $Al_2O_3$ concentration of 20% by weight. The viscosity thereof was measured. Further, a water dispersion was prepared by dispersing alumina hydrate particles (D) so that the concentration in terms of $Al_2O_3$ became 20% by weight, and the absorbance thereof was measured.

The results are also listed in Table 1.

Preparation of Coating Liquid for Forming Ink Receptive Layer

The above obtained alumina hydrate particles (D) were dispersed in water so that the solid concentration became 15% by weight. 100 parts by weight of this dispersion and 37.5 parts by weight of a 10% by weight aqueous solution of polyvinyl alcohol were mixed together, thereby obtaining a coating liquid.

Preparation of Recording Sheet

The obtained coating liquid was applied onto a PET film by means of a bar coater, dried, and heated at 140° C. Thus, a recording sheet was obtained. The thickness of ink receptive layer was 30 μm.

In the same manner as in Example 1, printing was performed on the obtained recording sheet and evaluated.

The results are also listed in Table 1.

Comparative Example 1

Powder of alumina hydrate particles (E) was prepared in the same manner as in Example 1 except that the temperature of hot air fed into spray drying zone was controlled at 450° C. and the temperature of gas discharged from the spray drying zone was controlled at 180±10° C.

With respect to the obtained alumina hydrate particles (E), the alkali metal content, ammonia content, average particle diameter and total pore volume were measured.

The results are listed in Table 1.

Alumina hydrate particles (E) were dispersed in water, thereby obtaining a water dispersion sol having an $Al_2O_3$ concentration of 20% by weight. The viscosity thereof was measured. Further, a water dispersion was prepared by dispersing alumina hydrate particles (E) so that the concentration in terms of $Al_2O_3$ became 20% by weight, and the absorbance thereof was measured.

The results are also listed in Table 1.

Preparation of Coating Liquid for Forming Ink Receptive Layer

The above obtained alumina hydrate particles (E) were dispersed in water so that the solid concentration became 15% by weight. 100 parts by weight of this dispersion and 37.5 parts by weight of a 10% by weight aqueous solution of polyvinyl alcohol were mixed together, thereby obtaining a coating liquid.

Preparation of Recording Sheet

The obtained coating liquid was applied onto a PET film by means of a bar coater, dried, and heated at 140° C. Thus, a recording sheet was obtained. The thickness of ink receptive layer was 30 μm. In the same manner as in Example 1, printing was performed on the obtained recording sheet and evaluated.

The results are also listed in Table 1.

Comparative Example 2

Alumina Hydrate Particle

An alumina hydrosol was prepared in the same manner as in Example 1 and concentrated in vacuum at 50° C., thereby obtaining an alumina hydrosol of 15% by weight concentration.

Part of the alumina hydrosol was air dried, thereby obtaining powder of alumina hydrate particles (F).

With respect to the obtained alumina hydrate particles (F), the alkali metal content, ammonia content, average particle diameter and total pore volume were measured.

The results are listed in Table 1.

Preparation of Water Dispersion Sol

Alumina hydrate particles (F) were dispersed in water, thereby obtaining a water dispersion sol having an $Al_2O_3$ concentration of 20% by weight. The viscosity thereof was measured. Further, a water dispersion was prepared by dispersing alumina hydrate particles (F) so that the concentration in terms of $Al_2O_3$ became 20% by weight, and the absorbance thereof was measured.

The results are also listed in Table 1.

Preparation of Coating Liquid for Forming Ink Receptive Layer

The above obtained alumina hydrate particles (F) were dispersed in water so that the solid concentration became 15% by weight. 100 parts by weight of the resultant alumina hydrosol and 37.5 parts by weight of a 10% by weight aqueous solution of polyvinyl alcohol were mixed together, thereby obtaining a coating liquid.

Preparation of Recording Sheet

The obtained coating liquid was applied onto a PET film by means of a bar coater, dried, and heated at 140° C. Thus, a recording sheet was obtained. The thickness of ink receptive layer was 30 μm. In the same manner as in Example 1, printing was performed on the obtained recording sheet and evaluated. The results are also listed in Table 1.

Comparative Example 3

Preparation of Alumina Hydrate Particle

While agitating 12.7 kg of an aqueous solution of sodium aluminate (concentration in terms of $Al_2O_3$: 3% by weight), 7.3 g of a 26% by weight aqueous solution of sodium gluconate was added thereto, and further 25 kg of an aqueous solution of aluminum sulfate (concentration in terms of $Al_2O_3$: 1.5% by weight) was added over a period of 12 min. Thus, an alumina hydrogel was obtained. At the time of preparation of the alumina hydrogel, the liquid temperature of alumina hydrogel is 30° C. and pH of the obtained alumina hydrogel is 10.2. Thereafter, the agitation was discontinued, and the alumina hydrogel was aged at 30° C. for 90 min.

The formed alumina hydrogel was separated by filtration, and satisfactorily washed with 1.5% aqueous ammonia. The amounts of alkali and sulfate radicals remaining in alumina hydrogel were 0.022% by weight in terms of $Na_2O$ (on dry basis) and 0.12% by weight in terms of $SO_4$ (on dry basis), respectively, based on the weight of $Al_2O_3$. Water was added to the washed alumina hydrogel so as to adjust the concentration in terms of $Al_2O_3$ to 5.0% by weight. Subsequently, 15% aqueous ammonia was added so as to adjust the pH value to 11.2, and, under slow agitation, aging of alumina hydrogel was performed at 60° C. for 10 hr.

During the aging, the pH value thereof was maintained at 11.2 by adding 15% aqueous ammonia.

Acetic acid was added at 95° C. in an amount of 15.5% by weight based on the weight of $Al_2O_3$, agitated for 3 hr, and cooled to 35° C. Pure water was added, thereby obtaining an alumina hydrosol having a concentration in terms of $Al_2O_3$ of 5.0% by weight.

The thus obtained alumina hydrosol was charged into a spray dryer, and spray drying was performed while controlling the temperature of hot air fed into spray drying zone at 250° C. and controlling the temperature of gas discharged from the spray drying zone at 100±10° C. Thus, powder of alumina hydrate particles (G) was obtained.

With respect to the obtained alumina hydrate particles (G), the alkali metal content, ammonia content, average particle diameter and total pore volume were measured.

The results are listed in Table 1.

Preparation of Water Dispersion Sol

Alumina hydrate particles (G) were dispersed in water, thereby obtaining a water dispersion sol having an $Al_2O_3$ concentration of 20% by weight. The viscosity thereof was measured. Further, a water dispersion was prepared by dispersing alumina hydrate particles (G) so that the concentration in terms of $Al_2O_3$ became 5% by weight, and the absorbance thereof was measured.

The results are also listed in Table 1.

Preparation of Coating Liquid for Forming Ink Receptive Layer

The above obtained alumina hydrate particles (G) were dispersed in water so that the solid concentration became 15% by weight. 100 parts by weight of this dispersion and 37.5 parts by weight of a 10% by weight aqueous solution of polyvinyl alcohol were mixed together, thereby obtaining a coating liquid.

Preparation of Recording Sheet

The obtained coating liquid was applied onto a PET film by means of a bar coater, dried, and heated at 140° C. Thus, a recording sheet was obtained. The thickness of ink receptive layer was 30 μm. In the same manner as in Example 1, printing was performed on the obtained recording sheet and evaluated. The results are also listed in Table 1.

TABLE 1

| | Alumina hydrate particle | | | | | Hydrate dispersion sol | | Ink receptive layer | | | |
|---|---|---|---|---|---|---|---|---|---|---|---|
| | content of $M_2O$ mol/mol $Al_2O_3$ × $10^{-4}$ | content of $(NH_4)_2O$ mol/mol $Al_2O_3$ × $10^{-4}$ | average particle diam. (μm) | total pore volume (ml/g) | pore volume (15–30 nm) (ml/g) | viscosity conc. 20 wt. % (cP) | absorbance conc. 20 wt. % | reflection density | anti-blotting | drying speed | water resistance |
| Example 1 | 3.5 | 2.8 | 0.05 | 0.91 | 0.50 | 100 | 0.82 | 1.4 | Excellent | Excellent | Excellent |
| Example 2 | 19.4 | 15.6 | 0.06 | 0.80 | 0.30 | 1490 | 1.18 | 1.3 | Good | Excellent | Excellent |
| Example 3 | 10.0 | 0.5 | 0.06 | 0.82 | 0.41 | 135 | 0.95 | 1.3 | Excellent | Excellent | Excellent |
| Example 4 | 12.8 | 3.9 | 0.06 | 1.20 | 0.71 | 57 | 1.25 | 1.4 | Excellent | Excellent | Excellent |

TABLE 1-continued

| | Alumina hydrate particle | | | | | Hydrate dispersion sol | | Ink receptive layer | | | |
|---|---|---|---|---|---|---|---|---|---|---|---|
| | content of $M_2O$ mol/mol $Al_2O_3$ × $10^{-4}$ | content of $(NH_4)_2O$ mol/mol $Al_2O_3$ × $10^{-4}$ | average particle diam. (μm) | total pore volume (ml/g) | pore volume (15–30 nm) (ml/g) | viscosity conc. 20 wt. % (cP) | absorbance conc. 20 wt. % | reflection density | anti-blotting | drying speed | water resistance |
| Comp. Ex. 1 | 4.6 | 3.0 | 0.30 | 0.45 | 0.20 | 4500 | 2.80 | 1.1 | Poor | Poor | Poor |
| Comp. Ex. 2 | 30.0 | 155.0 | 0.50 | 0.51 | 0.21 | 8400 | 3.10 | 1.0 | Poor | Poor | Poor |
| Comp. Ex. 3 | 3.5 | 25.0 | 0.03 | 0.31 | 0.10 | 6500 | 1.57 | 1.0 | Poor | Poor | Poor |

What is claimed is:

1. Alumina hydrate particles having a composition represented by the general formula:

$$xM_2O.y(NH_4)_2O.Al_2O_3.zH_2O$$

$$2\times10^{-4}\leqq x\leqq25\times10^{-4}$$

$$0.1\times10^{-4}\leqq y\leqq20\times10^{-4}$$

$$0.6\leqq z\leqq2.5$$

wherein M represents an alkali metal; when the alkali metal is in the form of $M_2O$, x is the number of moles thereof per mole of $Al_2O_3$; when ammonia is in the form of $(NH_4)_2O$, y is the number of moles thereof per mole of $Al_2O_3$; and z is the number of moles of hydration water ($H_2O$) per mole of $Al_2O_3$, said alumina hydrate particles having:

an average particle diameter of 0.02 to 0.2 μm, a total pore volume of 0.5 to 1.5 ml/g, and a volume of pores whose diameter is from 15 to 30 nm ranging from 0.3 to 1.0 ml/g.

2. An alumina hydrate particle dispersion sol comprising a dispersion of alumina hydrate particles in water, wherein said alumina hydrate particles have a composition represented by the general formula:

$$xM_2O.y(NH_4)_2O.Al_2O_3.zH_2O$$

$$2\times10^{-4}\leqq x\leqq25\times10^{-4}$$

$$0.1\times10^{-4}\leqq y\leqq20\times10^{-4}$$

$$0.6\leqq z\leqq2.5$$

wherein M represents an alkali metal; when the alkali metal is in the form of $M_2O$, x is the number of moles thereof per mole of $Al_2O_3$; when ammonia is in the form of $(NH_4)_2O$, y is the number of moles thereof per mole of $Al_2O_3$; and z is the number of moles of hydration water ($H_2O$) per mole of $Al_2O_3$, said alumina hydrate particles having:

an average particle diameter of 0.02 to 0.2 μm, a total pore volume of 0.5 to 1.5 ml/g, and a volume of pores whose diameter is from 15 to 30 nm ranging from 0.3 to 1.0 ml/g.

3. The alumina hydrate particle dispersion sol as claimed in claim 2 having an absorbance (ABS) of 2.0 or less exhibited when the $Al_2O_3$ has a concentration of 20% by weight.

4. The alumina hydrate particle dispersion sol as claimed in claim 2 having a viscosity of 50 to 2000 cP exhibited when the $Al_2O_3$ has a concentration of 20% by weight.

5. The alumina hydrate particle dispersion sol as claimed in claim 4 having an absorbance (ABS) of 2.0 or less exhibited when the $Al_2O_3$ has a concentration of 20% by weight.

6. A coating liquid for forming an ink receptive layer, comprising:

alumina hydrate particles and a binder, wherein said particles and binder are dispersed in one of water or an organic solvent, wherein the alumina hydrate particles have a composition represented by the general formula:

$$xM_2O.y(NH_4)_2O.Al_2O_3.zH_2O$$

$$2\times10^{-4}\leqq x\leqq25\times10^{-4}$$

$$0.1\times10^{-4}\leqq y\leqq20\times10^{-4}$$

$$0.6\leqq z\leqq2.5$$

wherein M represents an alkali metal; when the alkali metal is in the form of $M_2O$, x is the number of moles thereof per mole of $Al_2O_3$; when ammonia is in the form of $(NH_4)_2O$, y is the number of moles thereof per mole of $Al_2O_3$; and z is the number of moles of hydration water ($H_2O$) per mole of $Al_2O_3$, said alumina hydrate particles having:

an average particle diameter of 0.02 to 0.2 μm, a total pore volume of 0.5 to 1.5 ml/g, and a volume of pores whose diameter is from 15 to 30 nm ranging from 0.3 to 1.0 ml/g.

7. A recording sheet with ink receptive layer, comprising a substrate sheet having an ink receptive layer formed thereon from a coating liquid comprising:

alumina hydrate particles and a binder, wherein said particles and binder are dispersed in one of water or an organic solvent, wherein the alumina hydrate particles have a composition represented by the general formula:

$$xM_2O.y(NH_4)_2O.Al_2O_3.zH_2O$$

$$2\times10^{-4}\leqq x\leqq25\times10^{-4}$$

$$0.1\times10^{-4}\leqq y\leqq20\times10^{-4}$$

$$0.6\leqq z\leqq2.5$$

wherein M represents an alkali metal; when the alkali metal is in the form of $M_2O$, x is the number of moles thereof per mole of $Al_2O_3$; when ammonia is in the form of $(NH_4)_2O$, y is the number of moles thereof per mole of $Al_2O_3$; and z is the number of moles of hydration water ($H_2O$) per mole of $Al_2O_3$, said alumina hydrate particles having:

an average particle diameter of 0.02 to 0.2 μm, a total pore volume of 0.5 to 1.5 ml/g, and a volume of pores whose diameter is from 15 to 30 nm ranging from 0.3 to 1.0 ml/g.

* * * * *